United States Patent
Zhao et al.

(10) Patent No.: US 12,150,115 B2
(45) Date of Patent: Nov. 19, 2024

(54) METHOD PERFORMED BY USER EQUIPMENT, AND USER EQUIPMENT

(71) Applicant: SHARP KABUSHIKI KAISHA, Sakai (JP)

(72) Inventors: Yinan Zhao, Shanghai (CN); Renmao Liu, Shanghai (CN); Chao Luo, Shanghai (CN)

(73) Assignee: SHARP KABUSHIKI KAISHA, Sakai (JP)

(*) Notice: Subject to any disclaimer, the term of this patent is extended or adjusted under 35 U.S.C. 154(b) by 384 days.

(21) Appl. No.: 17/618,374

(22) PCT Filed: Apr. 26, 2020

(86) PCT No.: PCT/CN2020/086966
§ 371 (c)(1),
(2) Date: Dec. 10, 2021

(87) PCT Pub. No.: WO2020/248729
PCT Pub. Date: Dec. 17, 2020

(65) Prior Publication Data
US 2022/0417959 A1 Dec. 29, 2022

(30) Foreign Application Priority Data
Jun. 14, 2019 (CN) .......................... 201910519650.X

(51) Int. Cl.
H04W 4/00 (2018.01)
H04W 72/1263 (2023.01)
(Continued)

(52) U.S. Cl.
CPC ....... H04W 72/1263 (2013.01); H04W 72/23 (2023.01); H04W 92/18 (2013.01)

(58) Field of Classification Search
CPC ... H04W 4/46; H04W 72/12; H04W 72/1263; H04W 72/20; H04W 72/23; H04W 72/04;
(Continued)

(56) References Cited

U.S. PATENT DOCUMENTS

2019/0182827 A1* 6/2019 Wang .................... H04W 72/20
2019/0289627 A1* 9/2019 Blasco Serrano .... H04W 56/00

FOREIGN PATENT DOCUMENTS

WO 2018/174779 A1 9/2018

OTHER PUBLICATIONS

Huawei et al., "Miscellaneous corrections to 36.213", R1-1709666, 3GPP TSG RAN1 Meeting #89, Hangzhou, China, May 15-19, 2017.
(Continued)

Primary Examiner — Shantell L Heiber
(74) Attorney, Agent, or Firm — ScienBiziP, P.C.

(57) ABSTRACT

The present invention provides a method performed by user equipment and user equipment. The method comprises: receiving downlink control information (DCI) comprising sidelink communication scheduling information and transmitted by a base station; determining the number of bits in an indication field for lowest index of the subchannel allocation to the initial transmission; and determining a resource index of a physical sidelink control channel (PSCCH).

1 Claim, 8 Drawing Sheets

(51) Int. Cl.
*H04W 72/23* (2023.01)
*H04W 92/18* (2009.01)

(58) Field of Classification Search
CPC .................. H04W 72/40; H04W 72/50; H04J 2203/0069
See application file for complete search history.

(56) References Cited

OTHER PUBLICATIONS

"3rd Generation Partnership Project; Technical Specification Group Radio Access Network; Evolved Universal Terrestrial Radio Access (E-UTRA); Physical layer procedures(Release 14)", 3GPP TS 36.213 V14.3.0 (2017-06).

Sharp, "Correction on UE procedure for transmitting PSCCH in mode 3", R1-1909723, 3GPP TSG-RAN WG1 Meeting #98, Prague, Czech Republic, Aug. 26-30, 2019.

MCC Support, "Final Report of 3GPP TSG RAN WG1 #97 v1.0.0(Reno, USA, May 13-17, 2019)", R1-1907973, 3GPP TSG RAN WG1 Meeting #98, Prague, Czech Rep, Aug. 26-30, 2019.

Vodafone, "New SID: Study on NR V2X", RP-181480(RP-181429), 3GPP TSG RAN Meeting #80, La Jolla, USA, Jun. 11-14, 2018.

Huawei, CATT, LG Electronics, HiSilicon, China Unicom: "New WID on 3GPP V2X Phase 2", RP-170798, 3GPP TSG RAN Meeting #75, Dubrovnik, Croatia, Mar. 6-9, 2017.

LG Electronics, Huawei, HiSilicon, CATT, CATR: "New WI proposal: Support for V2V services based on LTE sidelink", RP-152293, 3GPP TSG RAN Meeting #70, Sitges, Spain, Dec. 7-10, 2015.

Qualcomm Incorporated: "Work Item Proposal for Enhanced LTE Device to Device Proximity Services", RP-142311, 3GPP TSG RAN Meeting #66, Maui, USA, Dec. 8-11, 2014.

Qualcomm Incorporated: "Work item proposal on LTE Device to Device Proximity Services", RP-140518, 3GPP TSG RAN Meeting #63, Fukuoka, Japan, Mar. 3-6, 2014.

\* cited by examiner

METHOD PERFORMED BY USER EQUIPMENT, AND USER EQUIPMENT

TECHNICAL FIELD

The present invention relates to the technical field of wireless communications, and in particular to a method performed by user equipment, and corresponding user equipment.

BACKGROUND

In conventional cellular networks, all communication needs to be forwarded via base stations. By contrast, D2D communication (device-to-device communication, device-to-device direct communication) refers to a direct communication method between two pieces of user equipment without forwarding via a base station or a core network. A research project on the use of LTE equipment to implement proximity D2D communication services was approved at the 3rd Generation Partnership Project (3GPP) RAN #63 plenary meeting in March 2014 (see Non-Patent Document 1). Functions introduced in the LTE Release 12 D2D include:
1) a discovery function between proximate devices in an LTE network coverage scenario;
2) a direct broadcast communication function between proximate devices; and
3) support for unicast and groupcast communication functions at higher layers.

A research project on enhanced LTE eD2D (enhanced D2D) was approved at the 3GPP RAN #66 plenary meeting in December 2014 (see Non-Patent Document 2). Main functions introduced in the LTE Release 13 eD2D include:
1) a D2D discovery in out-of-coverage and partial-coverage scenarios; and
2) a priority handling mechanism for D2D communication.

Based on the design of the D2D communication mechanism, a V2X feasibility research project based on D2D communication was approved at the 3GPP RAN #68 plenary meeting in June 2015. V2X stands for Vehicle to Everything, and intends to implement information exchange between a vehicle and all entities that may affect the vehicle, for the purpose of reducing accidents, alleviating traffic congestion, reducing environmental pollution, and providing other information services. Application scenarios of V2X mainly include four aspects:
1) V2V, Vehicle to Vehicle, i.e., vehicle-to-vehicle communication;
2) V2P, Vehicle to Pedestrian, i.e., a vehicle transmits alarms to a pedestrian or a non-motorized vehicle;
3) V2N: Vehicle-to-Network, i.e., a vehicle connects to a mobile network;
4) V2I: Vehicle-to-Infrastructure, i.e., a vehicle communicates with road infrastructure.

3GPP divides the research and standardization of V2X into three stages. The first stage was completed in September 2016, and was mainly focused on V2V and based on LTE Release 12 and Release 13 D2D (also known as sidelink communication), that is, the development of proximity communication technologies (see Non-Patent Document 3). V2X stage 1 introduced a new D2D communication interface referred to as PC5 interface. The PC5 interface is mainly intended to address the issue of cellular Internet of Vehicle (IoV) communication in high-speed (up to 250 km/h) and high-node density environments. Vehicles can exchange information such as position, speed, and direction through the PC5 interface, that is, the vehicles can communicate directly through the PC5 interface. Compared with the proximity communication between D2D devices, functions introduced in LTE Release 14 V2X mainly include:
1) higher density DMRS to support high-speed scenarios;
2) introduction of subchannels to enhance resource allocation methods; and
3) introduction of a user equipment sensing mechanism with semi-persistent scheduling.

The second stage of the V2X research project belonged to the LTE Release 15 research category (see Non-Patent Document 4). Main features introduced included high-order 64QAM modulation, V2X carrier aggregation, short TTI transmission, as well as feasibility study of transmit diversity.

The corresponding third stage, V2X feasibility research project based on 5G NR network technologies (see Non-Patent Document 5), was approved at the 3GPP RAN #80 plenary meeting in June 2018. The research plan of this project includes the research goal of using a 5G NR cellular network to control LTE sidelink communication, i.e., using 5G NR air interface technology and signaling to control LTE sidelink communication UE to perform sidelink communication over the LTE-PC5 interface. At the 3GPP RAN1 #97 meeting in May 2019 (see Non-Patent Document 6), the following meeting conclusions were reached regarding the use of an NR air interface to control LTE sidelink communication:
1) using an NR air interface to control (or schedule), through DCI, LTE sidelink Transmission Mode 3 that is based on semi-persistent scheduling (SPS) is supported;
2) the DCI introduced into the NR interface includes a SPS-related indication field in LTE DCI format 5A;
3) the number of bits (size) included in the DCI introduced above is equal to a value in the number of bits in DCI of one or a plurality of formats in the Rel-16 NR V2X project; the DCI of the one or plurality of formats in the above Rel-16 NR V2X project means DCI of one or a plurality of formats for an NR air interface controlling (or scheduling) an NR sidelink; and
4) SPS activation/deactivation takes effect after Z+X ms upon reception of the DCI introduced above, where Z is equal to a time offset in a current LTE V2X protocol, and X is always greater than zero.

The solution of the present invention mainly includes a method for sidelink communication UE to determine a PSCCH frequency domain resource in a scenario where LTE Sidelink Mode 3 (or another transmission mode based on base station scheduling) is controlled (or scheduled) by an NR air interface and in a scenario where LTE Sidelink Mode 3 (or another transmission mode based on base station scheduling) is controlled (or scheduled) by an LTE air interface.

PRIOR ART DOCUMENT

Non-Patent Documents

Non-Patent Document 1: RP-140518, Work item proposal on LTE Device to Device Proximity Services
Non-Patent Document 2: RP-142311, Work Item Proposal for Enhanced LTE Device to Device Proximity Services
Non-Patent Document 3: RP-152293, New WI proposal: Support for V2V services based on LTE sidelink
Non-Patent Document 4: RP-170798, New WID on 3GPP V2X Phase 2

Non-Patent Document 5: RP-181480, New SID Proposal: Study on NR V2X

Non-Patent Document 6: RAN1 #97, Chairman's Notes, Section 7.2.4.7

SUMMARY OF INVENTION

In order to solve at least part of the aforementioned problems, the present invention provides a method performed by user equipment and user equipment, enabling user equipment to determine a frequency domain resource of a physical sidelink control channel (PSCCH). For example, the sidelink communication UE can determine a frequency domain resource of a PSCCH in a scenario where LTE Sidelink Mode 3 (or another transmission mode based on base station scheduling) is controlled (or scheduled) by an NR air interface and in a scenario where LTE Sidelink Mode 3 (or another transmission mode based on base station scheduling) is controlled (or scheduled) by an LTE air interface, so that resources of a sidelink communication system employing base station scheduling can be effectively utilized.

According to a first aspect of the present invention, provided is a method performed by user equipment, the method including: receiving downlink control information (DCI) format 5A including sidelink communication scheduling information and transmitted by a base station eNB; determining the number of bits in an indication field for lowest index of the subchannel allocation to the initial transmission in DCI format 5A; and determining a resource index of a physical sidelink control channel (PSCCH).

In the foregoing method, if the indication field for lowest index of the subchannel allocation to the initial transmission is present, it can be determined that the resource index of the PSCCH is equal to a value indicated by the indication field for lowest index of the subchannel allocation to the initial transmission; and if the indication field for lowest index of the subchannel allocation to the initial transmission is not present, it can be determined that the resource index of the PSCCH is equal to 0.

In the foregoing method, it is possible that the number of bits in the indication field for lowest index of the subchannel allocation to the initial transmission is equal to floor($\log_2 N_{subchannel}^{SL}$), where $N_{subchannel}^{SL}$ represents the number of subchannels.

In the foregoing method, it is possible that the method further includes: determining a value of the indication field for lowest index of the subchannel allocation to the initial transmission.

In the foregoing method, it is possible that if the number of bits in the indication field for lowest index of the subchannel allocation to the initial transmission is determined as equal to 0 or if the number of subchannels is configured to be 1, it is determined that the value of the indication field for lowest index of the subchannel allocation to the initial transmission is equal to 0.

In the foregoing method, it is possible that the resource index of the PSCCH is determined as equal to the value of the indication field for lowest index of the subchannel allocation to the initial transmission.

In the foregoing method, it is possible that if the number of bits in the indication field for lowest index of the subchannel allocation to the initial transmission is determined as greater than 0 or if the indication field for lowest index of the subchannel allocation to the initial transmission is present, it is determined that the resource index of the PSCCH is equal to the value indicated by the indication field for lowest index of the subchannel allocation to the initial transmission; and if the number of bits in the indication field for lowest index of the subchannel allocation to the initial transmission is determined as equal to 0 or if the indication field for lowest index of the subchannel allocation to the initial transmission is not present, it is determined that the resource index of the PSCCH is equal to 0.

In the foregoing method, it is possible that if the number of subchannels is configured to be unequal to 1, it is determined that the resource index of the PSCCH is equal to the value indicated by the indication field for lowest index of the subchannel allocation to the initial transmission; and if the number of subchannels is configured to be equal to 1, it is determined that the resource index of the PSCCH is equal to 0.

In the foregoing method, it is possible that if the number of subchannels is configured to be equal to 1, it is determined that the number of bits in the indication field for lowest index of the subchannel allocation to the initial transmission is equal to 1.

In the foregoing method, it is possible that the resource index of the PSCCH is determined as the lowest index of a subchannel allocated for initial transmission in sidelink communication scheduling grant information.

According to a second aspect of the present invention, provided is user equipment, including: a processor; and a memory storing instructions, where the instructions, when run by the processor, perform the foregoing method.

Effect of Invention

According to the method performed by user equipment and the user equipment of the present invention, user equipment can determine a frequency domain resource of a physical sidelink control channel (PSCCH). For example, the sidelink communication UE can determine a frequency domain resource of a PSCCH in a scenario where LTE sidelink Mode 3 (or another transmission mode based on base station scheduling) is controlled (or scheduled) by an NR air interface and in a scenario where LTE Sidelink Mode 3 (or another transmission mode based on base station scheduling) is controlled (or scheduled) by an LTE air interface, so that resources of a sidelink communication system employing base station scheduling can be effectively utilized.

BRIEF DESCRIPTION OF THE DRAWINGS

The above and other features of the present invention will be more pronounced through the following detailed description taken in conjunction with the accompanying drawings.

DETAILED DESCRIPTION

Figure 1:
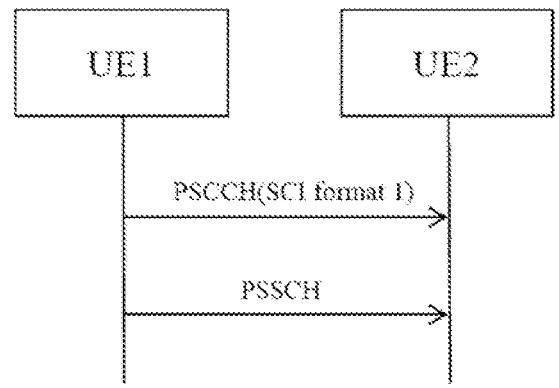
FIG. 1 is a schematic diagram showing sidelink communication of LTE V2X UE.

The following describes the present invention in detail with reference to the accompanying drawings and specific embodiments. It should be noted that the present invention is not limited to the specific embodiments described below. In addition, for simplicity, detailed description of the known art not directly related to the present invention is omitted to prevent confusion with respect to the understanding of the present invention.

In the following description, a 5G mobile communication system and its subsequently evolved versions are used as illustrative application environments to set forth a plurality of embodiments according to the present invention in detail. However, it is to be noted that the present invention is not limited to the following embodiments, and rather, it is applicable to many other wireless communication systems, such as a communication system later than 5G and a 4G mobile communication system earlier than the 5G.

Some terms involved in the present invention are described below. Unless otherwise specified, the terms used in the present invention adopt the definitions herein. The terms given in the present invention may be named differently in LTE, LTE-Advanced, LTE-Advanced Pro, NR, and later communication systems, but unified terms are adopted in the present invention. When applied to a specific system, the terms may be replaced with terms adopted in the corresponding system.

3GPP: 3rd Generation Partnership Project
LTE: Long Term Evolution
NR: New Radio
PDCCH: Physical Downlink Control Channel
DCI: Downlink Control Information
PDSCH: Physical Downlink Shared Channel
UE: User Equipment
eNB: evolved NodeB, evolved base station
gNB: NR base station
TTI: Transmission Time Interval
OFDM: Orthogonal Frequency Division Multiplexing
C-RNTI: Cell Radio Network Temporary Identifier
CSI: Channel State Indicator
HARQ: Hybrid Automatic Repeat Request
CSI-RS: CSI-Reference Signal, channel state measurement reference signal
CRS: Cell Reference Signal
PUCCH: Physical Uplink Control Channel
PUSCH: Physical Uplink Shared Channel
UL-SCH: Uplink Shared Channel
CG: Configured Grant
Sidelink: Sidelink communication
SCI: Sidelink Control Information
PSCCH: Physical Sidelink Control Channel
MCS: Modulation and Coding Scheme
RB: Resource Block
CRB: Common Resource Block
CP: Cyclic Prefix
PRB: Physical Resource Block
PSSCH: Physical Sidelink Shared Channel
FDM: Frequency Division Multiplexing
RRC: Radio Resource Control
RSRP: Reference Signal Receiving Power
SRS: Sounding Reference Signal
DMRS: Demodulation Reference Signal
CRC: Cyclic Redundancy Check
PSDCH: Physical Sidelink Discovery Channel
PSBCH: Physical Sidelink Broadcast Channel
SFI Slot Format Indication
TDD: Time Division Duplexing
FDD: Frequency Division Duplexing
SIB1: System Information Block Type 1
SLSS: Sidelink Synchronization Signal
PSSS: Primary Sidelink Synchronization Signal
SSSS: Secondary Sidelink Synchronization Signal
PCI: Physical Cell ID
PSS: Primary Synchronization Signal
SSS: Secondary Synchronization Signal
BWP: Bandwidth Part
GNSS: Global Navigation Satellite System
SFN: System Frame Number (radio frame number)
DFN: Direct Frame Number
IE: Information Element
SSB: Synchronization Signal Block
EN-DC: EUTRA-NR Dual Connection
MCG: Master Cell Group
SCG: Secondary Cell Group
PCell: Primary Cell
SCell: Secondary Cell
PSFCH: Physical Sidelink Feedback Channel
SPS: Semi-Persistent Scheduling
TA: Timing Advance The following is a description of the prior art associated with the solution of the present invention. Unless otherwise specified, the same terms in the specific embodiments have the same meanings as in the prior art.

It is worth pointing out that the V2X and sidelink mentioned in the description of the present invention have the same meaning. The V2X herein can also mean sidelink; similarly, the sidelink herein can also mean V2X, and no specific distinction and limitation will be made in the following text.

The resource allocation mode of V2X (sidelink) communication and the transmission mode of V2X (sidelink) communication in the description of the present invention can be replaced equivalently. The resource allocation mode involved in the description can mean transmission mode, and the transmission mode involved can mean resource allocation mode.

All LTE Sidelink (V2X) Transmission Mode 3 (Mode 3, or Resource Allocation Mode 3) involved in the description of the present invention may also refer to other transmission modes based on base station (eNB or gNB) scheduling (or referred to as based on scheduling), such as Transmission Mode 5.

In the description of the present invention, floor(.) represents a floor function, for example, floor(1.5)=1.

Sidelink Communication Scenario

1) Out-of-coverage sidelink communication: Both pieces of UE performing sidelink communication are out of network coverage (for example, the UE cannot detect any cell that meets a "cell selection criterion" on a frequency at which sidelink communication needs to be performed, and that means the UE is out of network coverage).

2) In-coverage sidelink communication: Both pieces of UE performing sidelink communication are in network coverage (for example, the UE detects at least one cell that meets a "cell selection criterion" on a frequency at which sidelink communication needs to be performed, and that means the UE is in network coverage).

3) Partial-coverage sidelink communication: One of two pieces of UE performing sidelink communication is out of network coverage, and the other is in network coverage.

From the perspective of a UE side, the UE has only two scenarios, out-of-coverage and in-coverage. Partial-coverage is described from the perspective of sidelink communication.

Basic Procedure of LTE V2X (Sidelink) Communication

FIG. 1 is a schematic diagram showing sidelink communication of LTE V2X UE. First, UE1 transmits to UE2 sidelink control information (SCI format 1), which is carried by a physical layer channel PSCCH. The SCI format 1 includes scheduling information of a PSSCH, such as a frequency domain resource of a PSSCH. Secondly, the UE1 transmits to the UE2 sidelink data, which is carried by the physical layer channel PSSCH. The PSCCH uses frequency division multiplexing with the corresponding PSSCH, that is, the PSCCH and the corresponding PSSCH are located in the same subframe in the time domain but are located on different PRBs in the frequency domain. Specific design methods of the PSCCH and the PSSCH are as follows:

1) The PSCCH occupies one subframe in the time domain and two consecutive PRBs in the frequency domain. Initialization of a scrambling sequence uses a predefined value 510. The PSCCH may carry the SCI format 1, where the SCI format 1 at least includes time-frequency domain resource information of the PSSCH. For example, for a frequency domain resource indication field, the SCI format 1 indicates a starting subchannel number and the number of consecutive subchannels of the PSSCH corresponding to the PSCCH.

2) The PSSCH occupies one subframe in the time domain, and uses frequency division multiplexing (FDM) with the corresponding PSCCH. The PSSCH occupies one or a plurality of consecutive subchannels in the frequency domain. The subchannel represents $n_{subCHsize}$ consecutive PRBs in the frequency domain, $n_{subCHsize}$ is configured by an RRC parameter, and a starting subchannel and the number of consecutive subchannels are indicated by a frequency domain resource indication field of the SCI format 1.

LTE V2X Resource Allocation Mode (Transmission Mode 3/4)

Figure 2:
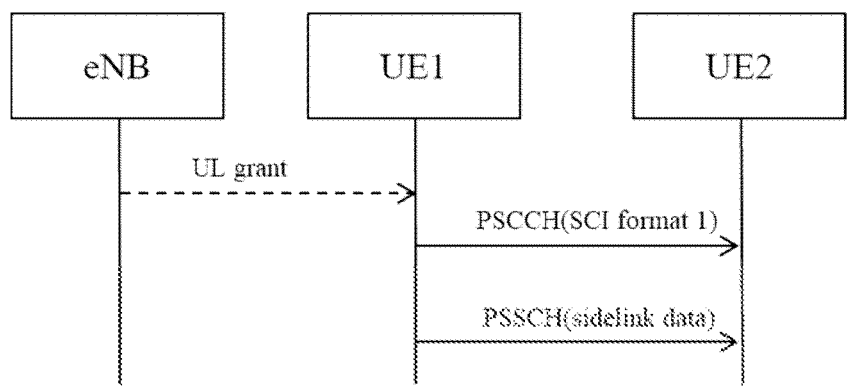
FIG. 2 is a schematic diagram showing a resource allocation mode of LTE V2X.

FIG. 2 shows two resource allocation modes of LTE V2X, which are referred to as base station scheduling-based resource allocation (Transmission Mode 3) and UE sensing-based resource allocation (Transmission Mode 4), respectively. In LTE V2X, in an eNB network coverage scenario, a base station can configure, through UE-level dedicated RRC signaling SL-V2X-ConfigDedicated, a resource allocation mode of UE, or referred to as a transmission mode of the UE, which is specifically as follows:

1) A base station scheduling-based resource allocation mode (Transmission Mode 3): The base station scheduling-based resource allocation mode means that frequency domain resources used for sidelink communication are from scheduling of the base station. Transmission Mode 3 includes two scheduling modes, which are dynamic scheduling and semi-persistent scheduling (SPS), respectively. For dynamic scheduling, a frequency domain resource of a PSSCH is included in a UL grant (DCI format 5A), and CRC of a PDCCH or an EPDCCH carrying DCI format 5A is scrambled with an SL-V-RNTI. For SPS, the base station configures one or a plurality of (at most 8) configured scheduling grants (configured grants) through an IE: SPS-ConfigSL-r14, and each configured scheduling grant contains a scheduling grant index and a scheduling grant resource period. The UL grant (DCI format 5A) includes a frequency domain resource of a PSSCH, as well as a scheduling grant index indication information (3 bits), and SPS activation or release (or deactivation) indication information. CRC of a PDCCH or an EPDCCH carrying DCI format 5A is scrambled with an SL-SPS-V-RNTI.

Specifically, when RRC signaling SL-V2X-ConfigDedicated is set to scheduled-r14, it indicates that the UE is configured in the base station scheduling-based transmission mode. The base station configures the SL-V-RNTI or the SL-SPS-V-RNTI through RRC signaling, and transmits an uplink scheduling grant (UL grant) to the UE through the PDCCH or the EPDCCH (DCI format 5A, in which the CRC is scrambled with the SL-V-RNTI or the SL-SPS-V-RNTI). The above uplink scheduling grant (UL grant) includes at least scheduling information of the PSSCH frequency domain resource in sidelink communication. When the UE successfully detects the PDCCH or the EPDCCH scrambled with the SL-V-RNTI or the SL-SPS-V-RNTI, the UE uses a PSSCH frequency domain resource indication field in the uplink scheduling grant (UL grant) (DCI format 5A) as PSSCH frequency domain resource indication information in the PSCCH (SCI format 1), and transmits the PSCCH (SCI format 1) and the corresponding PSSCH.

For the SPS in Transmission Mode 3, the UE receives the SL-SPS-V-RNTI scrambled DCI format 5A in downlink subframe n. If DCI format 5A includes SPS activation indication information, the UE determines a frequency domain resource of the PSSCH according to the indication information in DCI format 5A, and determines a time domain resource of the PSSCH (a PSSCH transmission subframe) according to information such as subframe n.

2) UE sensing-based resource allocation mode (Transmission Mode 4): The UE sensing-based resource allocation mode means that resources used for sidelink communication are based on a procedure of sensing a candidate available resource set by the UE. When the RRC signaling SL-V2X-ConfigDedicated is set to ue-Selected-r14, it indicates that the UE is configured in the UE sensing-based transmission mode. In the UE sensing-based transmission mode, the base station configures an available transmission resource pool, and the UE determines a PSSCH sidelink transmission resource in the transmission resource pool according to a certain rule (for a detailed description of the procedure, see the LTE V2X UE sensing procedure section), and transmits a PSCCH (SCI format 1) and a corresponding PSSCH.

LTE V2X DCI format 5A (DCI 5A)

In Rel-14 LTE V2X, DCI format 5A is used to schedule a PSCCH, and also includes an indication field for scheduling a PSSCH in the SCI format 1.

Specifically, DCI format 5A includes the following information:
- a carrier indication field (carrier indicator, 3 bits);
- lowest index of the subchannel allocation to the initial transmission;
- SCI format 1 related indication fields:
  - frequency resource allocation of initial transmission and retransmission (frequency resource location of initial transmission and retransmission);
  - indication of a time gap between initial transmission and retransmission (time gap between initial transmission and retransmission);
- a sidelink communication SL index (SL index, 2 bits);
- when CRC in DCI format 5A is scrambled with an SL-SPS-V-RNTI, there are also the following indication fields in DCI format 5A:
  - a sidelink communication SL SPS configuration index indication field (SL SPS configuration index, 3 bits); and
  - an activation/deactivation (release) indication field (activation/release indication, 1 bit).

Method for LTE V2X UE to Determine PSCCH Resource Block Pool

When configuration information or pre-configuration information of a resource pool includes "UE always transmits a PSCCH and a corresponding PSSCH on adjacent RBs," a PSCCH resource index in (PSCCH resource m) consists of two consecutive PRBs in the frequency domain, and the index of the PRBs $n_{PRB}$ is $n_{PRB}=n_{subCHRBstart}+m \times n_{subCHsize}+j$, j=0, 1, where $n_{subCHRBstart}$ and $n_{subCHsize}$ are indicated by a higher-layer RRC parameter.

When the configuration information or pre-configuration information of the resource pool includes "the UE may transmit the PSCCH and the corresponding PSSCH on non-adjacent RBs," the PSCCH resource index m (PSCCH resource m) consists of two consecutive PRBs in the frequency domain, and the index of the PRBs $n_{PRB}$ is $n_{PRB}=n_{PSCCHstart}+2 \times m+j$, j=0, 1, where $n_{PSCCHstart}$ is indicated by a higher-layer RRC parameter.

LTE V2X Resource Pool Subchannel Configuration Information

An LTE V2X resource pool is configured through an RRC information element SL-CommResourcePoolV2X-r14, which includes configurations such as the number of subchannels and the size of the subchannels. The number of subchannels is represented by a parameter numSubchannel-r14, and the value of the parameter numSubchannel-r14 includes 1, 3, 5, 8, 10, 15, and 20. In the embodiments of this patent, $N_{subchannel}^{SL}$ is used to represent the number of subchannels.

Hereinafter, specific examples and embodiments related to the present invention are described in detail. In addition, as described above, the examples and embodiments described in the present disclosure are illustrative descriptions for facilitating understanding of the present invention, rather than limiting the present invention.

Figure 3:
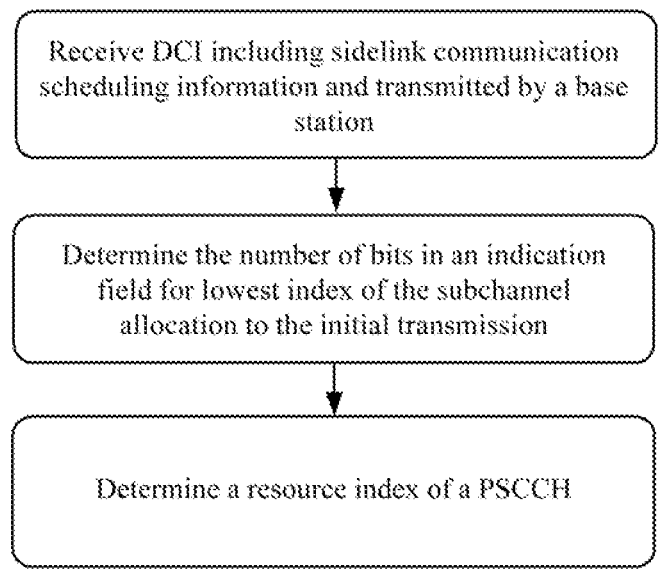
FIG. 3 is a diagram schematically showing a basic procedure of a method of user equipment of the present invention.

FIG. 3 is a diagram schematically showing a basic procedure of a method of user equipment of the present invention, in which the method performed by user equipment (UE) includes a first step, a second step, and a third step. In the first step, the UE receives DCI including sidelink communication scheduling information and transmitted by a base station. In the second step, the UE determines the number of bits in an indication field for lowest index of the subchannel allocation to the initial transmission. In the third step, the UE determines a resource index of a physical sidelink control channel (PSCCH). According to the method, user equipment can determine a frequency domain resource of a PSCCH. For example, the sidelink communication UE can determine a frequency domain resource of a PSCCH in a scenario where LTE Sidelink Mode 3 (or another transmission mode based on base station scheduling) is controlled (or scheduled) by an NR air interface and in a scenario where LTE Sidelink Mode 3 (or another transmission mode based on base station scheduling) is controlled (or scheduled) by an LTE air interface, so that resource utilization efficiency of the entire communication system can be increased.

Embodiment 1

Figure 4:
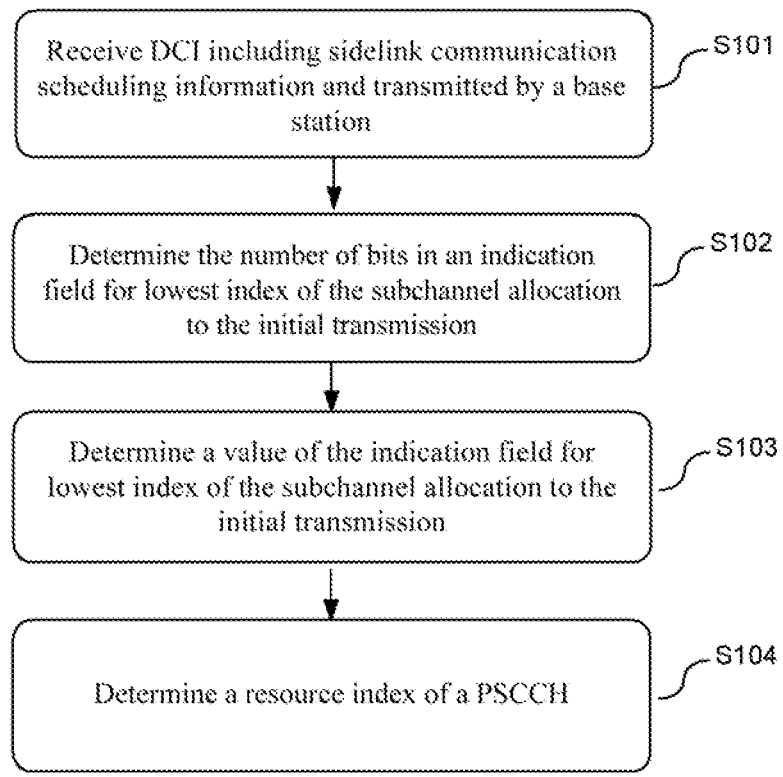
FIG. 4 is a schematic diagram showing a basic procedure of a method performed by user equipment according to Embodiment 1 of the present invention.

FIG. 4 is a schematic diagram showing a basic procedure of a method performed by user equipment according to Embodiment 1 of the present invention.

The method performed by user equipment according to Embodiment 1 of the present invention is described below in conjunction with the basic procedure shown in FIG. 4.

As shown in FIG. 4, in Embodiment 1 of the present invention, steps performed by the user equipment include the following steps.

In step S101, the user equipment receives DCI including sidelink communication scheduling information and transmitted by a base station.

Optionally, the user equipment is LTE sidelink communication user equipment.

Optionally, the base station is an eNB.

Optionally, the DCI including the sidelink communication scheduling information is DCI format 5A.

In step S102, the user equipment determines the number of bits in an indication field for lowest index of the subchannel allocation to the initial transmission.

Optionally, the user equipment determines that the number of bits in the indication field for lowest index of the subchannel allocation to the initial transmission is 0.

Alternatively, optionally, the user equipment determines that the number of bits in the indication field for lowest index of the subchannel allocation to the initial transmission is equal to floor($\log_2 N_{subchannel}^{SL}$).

Alternatively, optionally, if the number of subchannels $N_{subchannel}^{SL}$ is configured to be 1, the user equipment determines that the number of bits in the indication field for lowest index of the subchannel allocation to the initial transmission is 0.

In step S103, the user equipment determines a value of the indication field for lowest index of the subchannel allocation to the initial transmission.

Optionally, if the user equipment determines that the number of bits in the indication field for lowest index of the subchannel allocation to the initial transmission is 0, the user equipment determines that the value of the indication field for lowest index of the subchannel allocation to the initial transmission is equal to 0.

In step S104, the user equipment determines a resource index $L_{Init}$ of a physical sidelink control channel (PSCCH).

Optionally, the user equipment determines that the resource index $L_{Init}$ of the PSCCH is equal to the value of the indication field for lowest index of the subchannel allocation to the initial transmission.

Optionally, if the user equipment determines that the value of the indication field for lowest index of the subchannel allocation to the initial transmission is equal to 0, the user equipment determines that the resource index $L_{Init}$ of the PSCCH is equal to 0.

Embodiment 2

Figure 5:
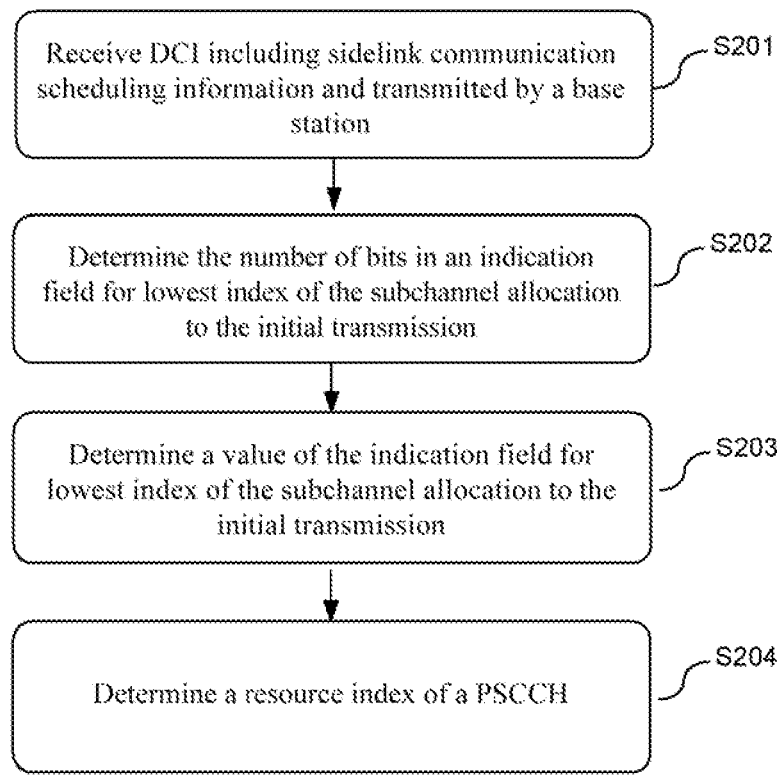
FIG. 5 is a schematic diagram showing a basic procedure of a method performed by user equipment according to Embodiment 2 of the present invention.

FIG. 5 is a schematic diagram showing a basic procedure of a method performed by user equipment according to Embodiment 2 of the present invention.

The method performed by user equipment according to Embodiment 2 of the present invention is described below in conjunction with the basic procedure shown in FIG. 5.

As shown in FIG. 5, in Embodiment 2 of the present invention, steps performed by the user equipment include the following steps.

In step S201, the user equipment receives DCI including sidelink communication scheduling information and transmitted by a base station.

Optionally, the user equipment is LTE sidelink communication user equipment.

Optionally, the base station is an eNB.

Optionally, the DCI including the sidelink communication scheduling information is DCI format 5A.

In step S202, the user equipment determines the number of bits in an indication field for lowest index of the subchannel allocation to the initial transmission.

Optionally, the user equipment determines that the number of bits in the indication field for lowest index of the subchannel allocation to the initial transmission is equal to $\mathrm{floor}(\log_2 N_{subchannel}^{SL})$.

In step S203, the user equipment determines a value of the indication field for lowest index of the subchannel allocation to the initial transmission.

Optionally, if the number of subchannels $N_{subchannel}^{SL}$ is configured to be 1, the user equipment determines that the value of the indication field for lowest index of the subchannel allocation to the initial transmission is equal to 0.

In step S204, the user equipment determines a resource index $L_{Init}$ of a physical sidelink control channel (PSCCH).

Optionally, the user equipment determines that the resource index $L_{Init}$ of the PSCCH is equal to the value of the indication field for lowest index of the subchannel allocation to the initial transmission.

Optionally, if the user equipment determines that the value of the indication field for lowest index of the subchannel allocation to the initial transmission is equal to 0, the user equipment determines that the resource index $L_{Init}$ of the PSCCH is equal to 0.

Embodiment 3

Figure 6:
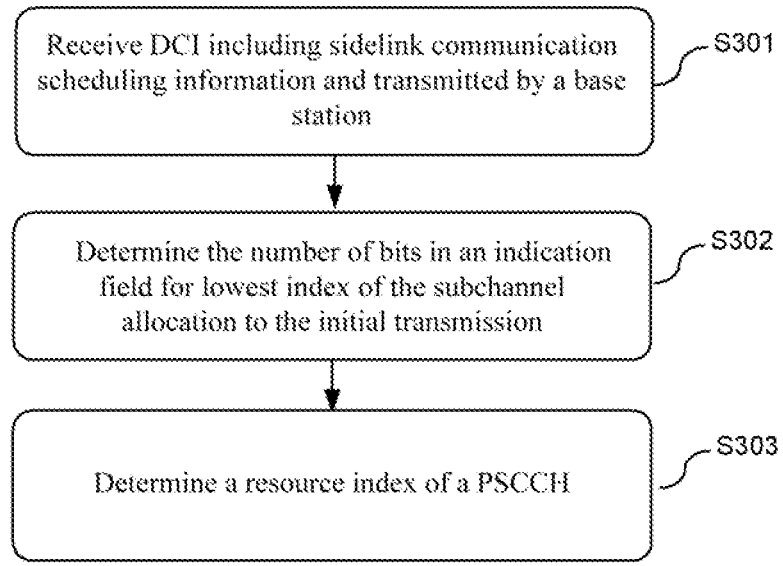
FIG. 6 is a schematic diagram showing a basic procedure of a method performed by user equipment according to Embodiment 3 of the present invention.

FIG. 6 is a schematic diagram showing a basic procedure of a method performed by user equipment according to Embodiment 3 of the present invention.

The method performed by user equipment according to Embodiment 3 of the present invention is described below in conjunction with the basic procedure shown in FIG. 6.

As shown in FIG. 6, in Embodiment 3 of the present invention, steps performed by the user equipment include the following steps.

In step S301, the user equipment receives DCI including sidelink communication scheduling information and transmitted by a base station.

Optionally, the user equipment is LTE sidelink communication user equipment.

Optionally, the base station is an eNB.

Optionally, the DCI including the sidelink communication scheduling information is DCI format 5A.

In step S302, the user equipment determines the number of bits in an indication field for lowest index of the subchannel allocation to the initial transmission.

Optionally, the user equipment determines that the number of bits in the indication field for lowest index of the subchannel allocation to the initial transmission is equal to $\mathrm{floor}(\log_2 N_{subchannel}^{SL})$.

In step S303, the user equipment determines a resource index $L_{Init}$ of a physical sidelink control channel (PSCCH).

Optionally, if the user equipment determines that the number of bits in the indication field for lowest index of the subchannel allocation to the initial transmission is greater than 0, or if the indication field for lowest index of the subchannel allocation to the initial transmission is present, the user equipment determines that the resource index $L_{Init}$ of the PSCCH is equal to a value indicated by the indication field for lowest index of the subchannel allocation to the initial transmission. Otherwise, optionally, the user equipment determines that the resource index $L_{Init}$ of the PSCCH is equal to 0.

Optionally, if the user equipment determines that the number of bits in the indication field for lowest index of the subchannel allocation to the initial transmission is equal to 0, or if the indication field for lowest index of the subchannel allocation to the initial transmission is not present or is missing or absent, the user equipment determines that the resource index $L_{Init}$ of the PSCCH is equal to 0. Otherwise, optionally, the user equipment determines that the resource index $L_{Init}$ of the PSCCH is equal to the value indicated by the indication field for lowest index of the subchannel allocation to the initial transmission.

Embodiment 4

Figure 7:
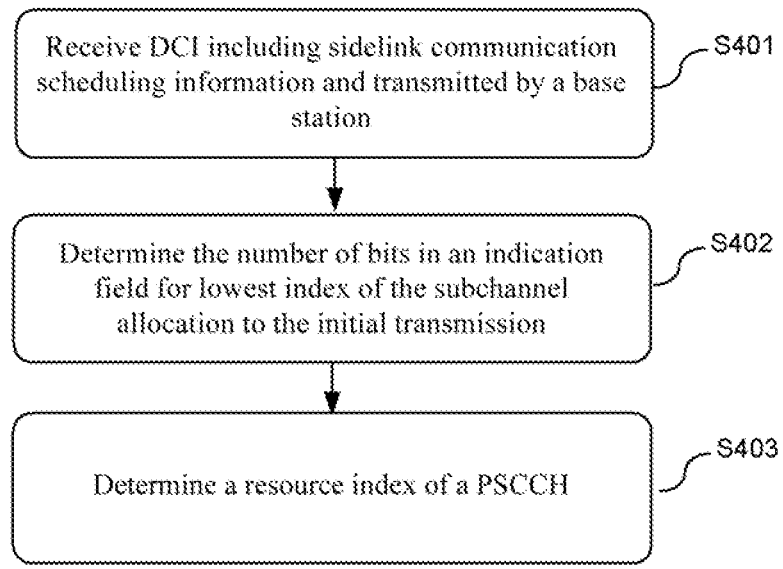
FIG. 7 is a schematic diagram showing a basic procedure of a method performed by user equipment according to Embodiment 4 of the present invention.

FIG. 7 is a schematic diagram showing a basic procedure of a method performed by user equipment according to Embodiment 4 of the present invention.

The method performed by user equipment according to Embodiment 4 of the present invention is described below in conjunction with the basic procedure shown in FIG. 7.

As shown in FIG. 7, in Embodiment 4 of the present invention, steps performed by the user equipment include the following steps.

In step S401, the user equipment receives DCI including sidelink communication scheduling information transmitted by a base station.

Optionally, the user equipment is LTE sidelink communication user equipment.

Optionally, the base station is an eNB.

Optionally, the DCI including the sidelink communication scheduling information is DCI format 5A.

In step S402, the user equipment determines the number of bits in an indication field for lowest index of the subchannel allocation to the initial transmission.

Optionally, the user equipment determines that the number of bits in the indication field for lowest index of the subchannel allocation to the initial transmission is equal to $\mathrm{floor}(\log_2 N_{subchannel}^{SL})$.

In step S403, the user equipment determines a resource index $L_{Init}$ of a physical sidelink control channel (PSCCH).

Optionally, if the number of subchannels $N_{subchannel}^{SL}$ is configured to be greater than 1, or the number of subchannels $N_{subchannel}^{SL}$ is configured to be unequal to 1, the user equipment determines that the resource index $L_{Init}$ of the PSCCH is equal to a value indicated by the indication field for lowest index of the subchannel allocation to the initial transmission. Otherwise, optionally, the user equipment determines that the resource index $L_{Init}$ of the PSCCH is equal to 0.

Optionally, if the number of subchannels $N_{subchannel}^{SL}$ is configured to be equal to 1, the user equipment determines that the resource index $L_{Init}$ of the PSCCH is equal to 0. Otherwise, optionally, the user equipment determines that the resource index $L_{Init}$ of the PSCCH is equal to the value indicated by the indication field for lowest index of the subchannel allocation to the initial transmission.

Embodiment 5

Figure 8:
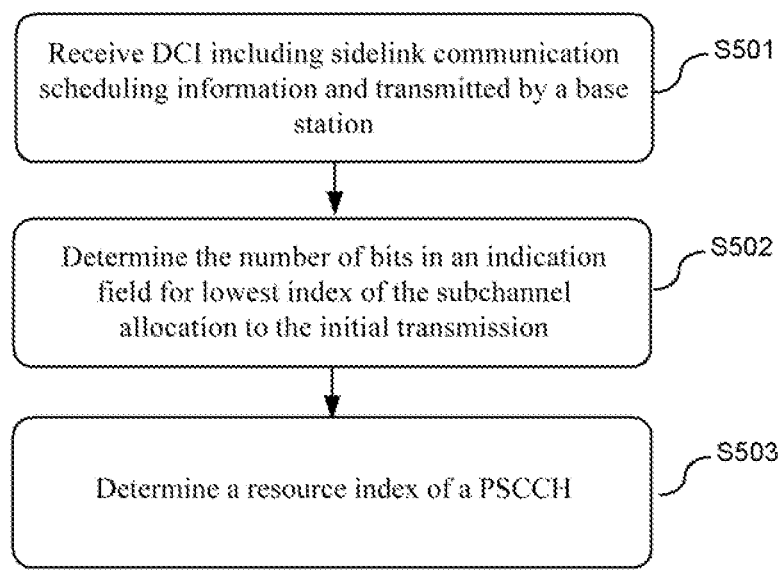
FIG. 8 is a schematic diagram showing a basic procedure of a method performed by user equipment according to Embodiment 5 of the present invention.

FIG. 8 is a schematic diagram showing a basic procedure of a method performed by user equipment according to Embodiment 5 of the present invention.

The method performed by user equipment according to Embodiment 5 of the present invention is described below in conjunction with the basic procedure shown in FIG. 8.

As shown in FIG. 8, in Embodiment 5 of the present invention, steps performed by the user equipment include the following steps.

In step S501, the user equipment receives DCI including sidelink communication scheduling information and transmitted by a base station.

Optionally, the user equipment is LTE sidelink communication user equipment.

Optionally, the base station is an eNB.

Optionally, the DCI including the sidelink communication scheduling information is DCI format 5A.

In step S502, the user equipment determines the number of bits in an indication field for lowest index of the subchannel allocation to the initial transmission.

Optionally, if $N_{subchannel}^{SL} > 1$ or $N_{subchannel}^{SL}$ is unequal to 1, the user equipment determines that the number of bits in the indication field for lowest index of the subchannel allocation to the initial transmission is equal to floor($\log_2 N_{subchannel}^{SL}$). Otherwise, optionally, the user equipment determines that the number of bits in the indication field for lowest index of the subchannel allocation to the initial transmission is equal to 1. Optionally, the 1-bit indication field is set to 0.

Alternatively, optionally, if $N_{subchannel}^{SL} = 1$, the user equipment determines that the number of bits in the indication field for lowest index of the subchannel allocation to the initial transmission is equal to 1. Optionally, the 1-bit indication field is set to 0. Otherwise, optionally, the user equipment determines that the number of bits in the indication field for lowest index of the subchannel allocation to the initial transmission is equal to floor ($\log_2 N_{subchannel}^{SL}$).

In step S503, the user equipment determines a resource index $L_{Init}$ of a physical sidelink control channel (PSCCH).

Optionally, the user equipment determines that the resource index $L_{Init}$ of the PSCCH is equal to the value of the indication field for lowest index of the subchannel allocation to the initial transmission.

Optionally, if the user equipment determines that the value of the indication field for lowest index of the subchannel allocation to the initial transmission is equal to 0, the user equipment determines that the resource index $L_{Init}$ of the PSCCH is equal to 0.

Embodiment 6

Figure 9:
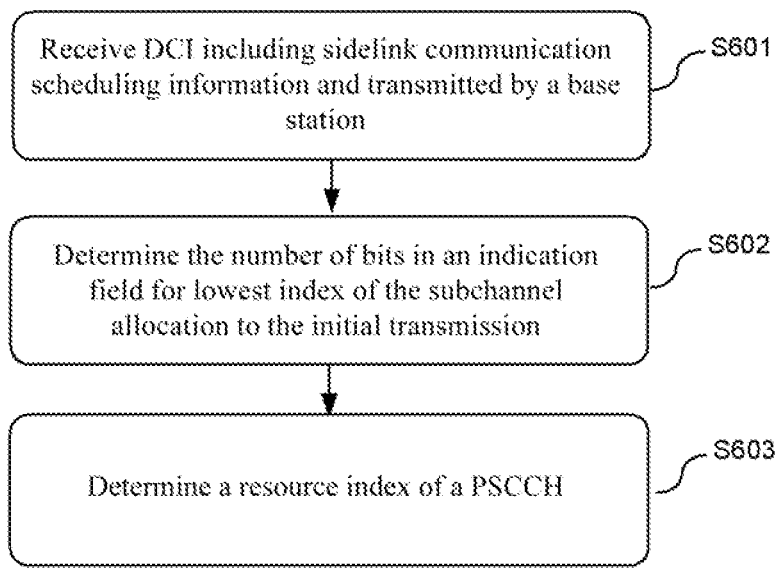
FIG. 9 is a schematic diagram showing a basic procedure of a method performed by user equipment according to Embodiment 6 of the present invention.

FIG. 9 is a schematic diagram showing a basic procedure of a method performed by user equipment according to Embodiment 6 of the present invention.

The method performed by user equipment according to Embodiment 6 of the present invention is described in detail below in conjunction with the basic procedure diagram shown in FIG. 9.

As shown in FIG. 9, in Embodiment 6 of the present invention, steps performed by the user equipment include the following steps.

In step S601, the user equipment receives DCI including sidelink communication scheduling information and transmitted by a base station.

Optionally, the user equipment is LTE sidelink communication user equipment.

Optionally, the base station is an eNB.

Optionally, the DCI including the sidelink communication scheduling information is DCI format 5A.

In step S602, the user equipment determines the number of bits in an indication field for lowest index of the subchannel allocation to the initial transmission.

Optionally, the user equipment determines that the number of bits in the indication field for lowest index of the subchannel allocation to the initial transmission is equal to floor($\log_2 N_{subchannel}^{SL}$).

In step S603, the user equipment determines a resource index $L_{Init}$ of a physical sidelink control channel (PSCCH).

Optionally, the user equipment determines that the resource index $L_{Init}$ of the PSCCH as the lowest index of the subchannel allocated for the initial transmission in sidelink communication scheduling (or configuration) grant information.

Optionally, if the number of subchannels is configured to be 1, or if the user equipment determines that the number of bits in the indicator for lowest index of the subchannel allocation to the initial transmission is 0, the user equipment determines the resource index $L_{Init}$ of the PSCCH is 0.

Embodiment 7

Figure 10:
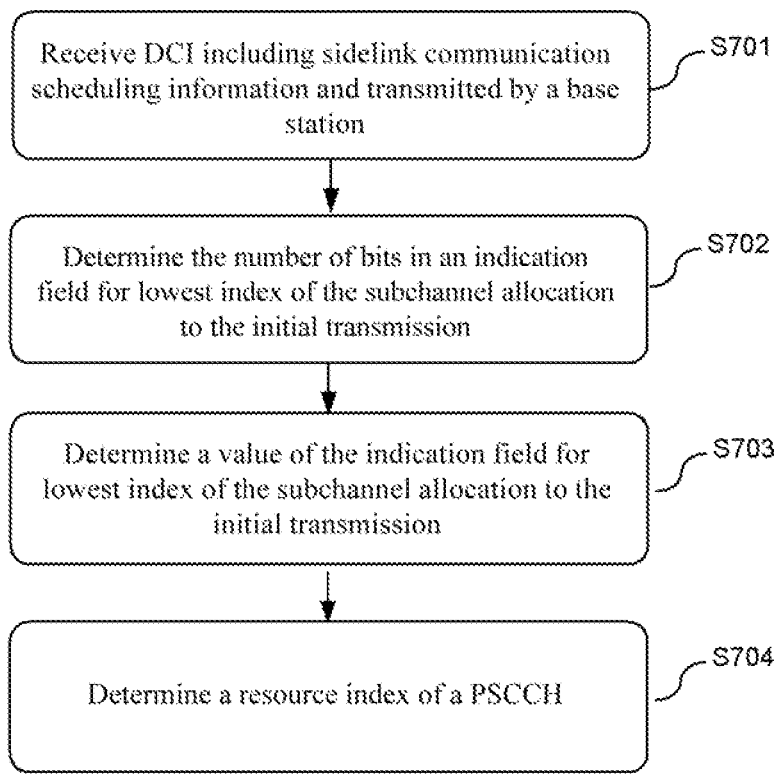
FIG. 10 is a schematic diagram showing a basic procedure of a method performed by user equipment according to Embodiment 7 of the present invention.

FIG. 10 is a schematic diagram showing a basic procedure of a method performed by user equipment according to Embodiment 7 of the present invention.

The method performed by user equipment according to Embodiment 7 of the present invention is described in detail below in conjunction with the basic procedure diagram shown in FIG. 10.

As shown in FIG. 10, in Embodiment 7 of the present invention, steps performed by the user equipment include the following steps.

In step S701, the user equipment receives DCI including sidelink communication scheduling information and transmitted by a base station.

Optionally, the user equipment is LTE sidelink communication user equipment.

Optionally, the base station is a gNB.

Optionally, the DCI including the sidelink communication scheduling information includes an SPS activation/release indication field.

In step S702, the user equipment determines the number of bits in an indication field for lowest index of the subchannel allocation to the initial transmission.

Optionally, the user equipment determines that the number of bits in the indication field for lowest index of the subchannel allocation to the initial transmission is 0.

Alternatively, optionally, the user equipment determines that the number of bits in the indication field for lowest index of the subchannel allocation to the initial transmission is equal to floor($\log_2 N_{subchannel}^{SL}$).

Alternatively, optionally, if the number of subchannels $N_{subchannel}^{SL}$ is configured to be 1, the user equipment determines that the number of bits in the indication field for lowest index of the subchannel allocation to the initial transmission is 0.

In step S703, the user equipment determines a value of the indication field for lowest index of the subchannel allocation to the initial transmission.

Optionally, if the user equipment determines that the number of bits in the indication field for lowest index of the subchannel allocation to the initial transmission is 0, the user equipment determines that the value of the indication field for lowest index of the subchannel allocation to the initial transmission is equal to 0.

In step S704, the user equipment determines a resource index $L_{Init}$ of a physical sidelink control channel (PSCCH).

Optionally, the user equipment determines that the resource index $L_{Init}$ of the PSCCH is equal to the value of the indication field for lowest index of the subchannel allocation to the initial transmission.

Optionally, if the user equipment determines that the value of the indication field for lowest index of the subchannel allocation to the initial transmission is equal to 0, the user equipment determines that the resource index $L_{Init}$ of the PSCCH is equal to 0.

Embodiment 8

Figure 11:
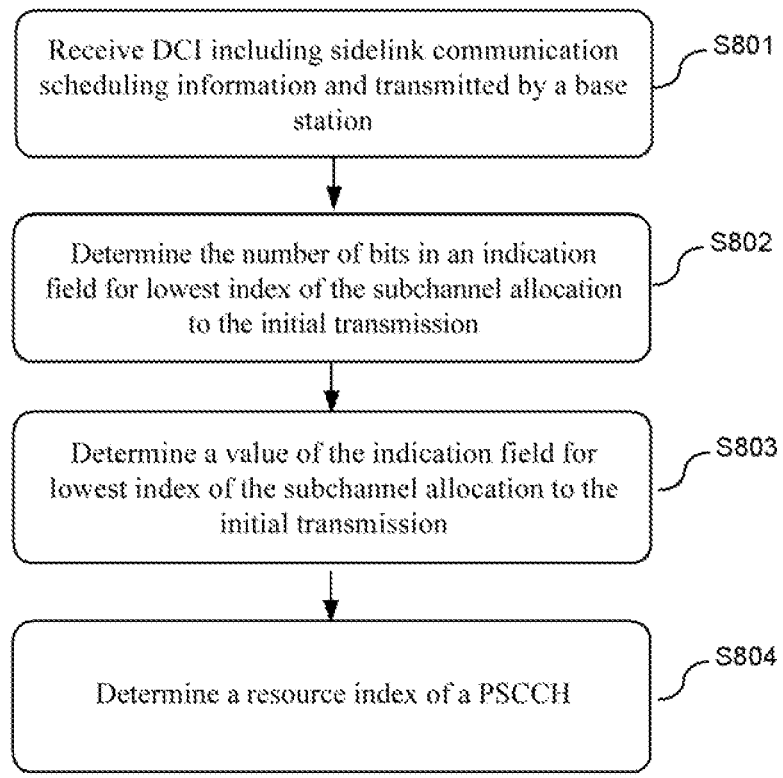
FIG. 11 is a schematic diagram showing a basic procedure of a method performed by user equipment according to Embodiment 8 of the present invention.

FIG. 11 is a schematic diagram showing a basic procedure of a method performed by user equipment according to Embodiment 8 of the present invention.

The method performed by user equipment according to Embodiment 8 of the present invention is described in detail below in conjunction with the basic procedure diagram shown in FIG. 11.

As shown in FIG. 11, in Embodiment 8 of the present invention, steps performed by the user equipment include the following steps.

In step S801, the user equipment receives DCI including sidelink communication scheduling information and transmitted by a base station.

Optionally, the user equipment is LTE sidelink communication user equipment.

Optionally, the base station is a gNB.

Optionally, the DCI including the sidelink communication scheduling information includes an SPS activation/release indication field.

In step S802, the user equipment determines the number of bits in an indication field for lowest index of the subchannel allocation to the initial transmission.

Optionally, the user equipment determines that the number of bits in the indication field for lowest index of the subchannel allocation to the initial transmission is equal to floor($\log_2 N_{subchannel}^{SL}$).

In step S803, the user equipment determines a value of the indication field for lowest index of the subchannel allocation to the initial transmission.

Optionally, if the number of subchannels $N_{subchannel}^{SL}$ is configured to be 1, the user equipment determines that the value of the indication field for lowest index of the subchannel allocation to the initial transmission is equal to 0.

In step S804, the user equipment determines a resource index $L_{Init}$ of a physical sidelink control channel (PSCCH).

Optionally, the user equipment determines that the resource index $L_{Init}$ of the PSCCH is equal to the value of the indication field for lowest index of the subchannel allocation to the initial transmission.

Optionally, if the user equipment determines that the value of the indication field for lowest index of the subchannel allocation to the initial transmission is equal to 0, the user equipment determines that the resource index $L_{Init}$ of the PSCCH is equal to 0.

Embodiment 9

Figure 12:
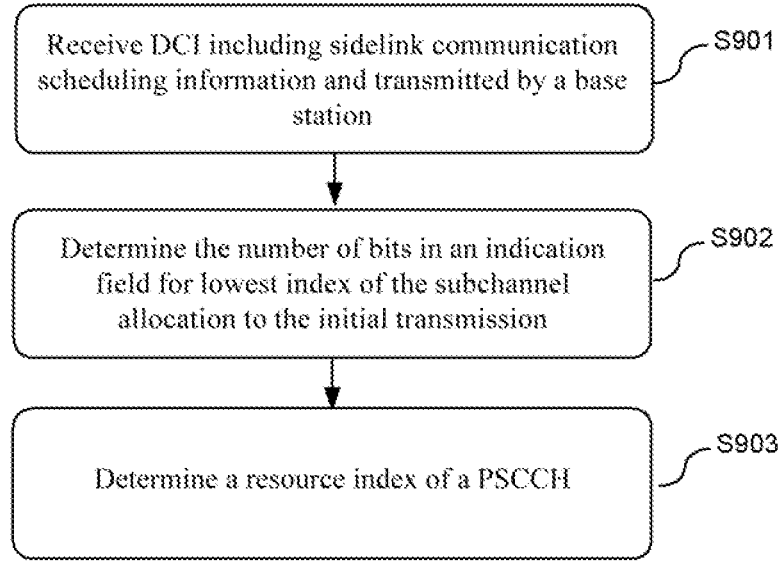
FIG. 12 is a schematic diagram showing a basic procedure of a method performed by user equipment according to Embodiment 9 of the present invention.

FIG. 12 is a schematic diagram showing a basic procedure of a method performed by user equipment according to Embodiment 9 of the present invention.

The method performed by user equipment according to Embodiment 9 of the present invention is described in detail below in conjunction with the basic procedure diagram shown in FIG. 12.

As shown in FIG. 12, in Embodiment 9 of the present invention, steps performed by the user equipment include the following steps.

In step S901, the user equipment receives DCI including sidelink communication scheduling information and transmitted by a base station.

Optionally, the user equipment is LTE sidelink communication user equipment.

Optionally, the base station is a gNB.

Optionally, the DCI including the sidelink communication scheduling information includes an SPS activation/release indication field.

In step S902, the user equipment determines the number of bits in an indication field for lowest index of the subchannel allocation to the initial transmission.

Optionally, the user equipment determines that the number of bits in the indication field for lowest index of the subchannel allocation to the initial transmission is equal to floor($\log_2 N_{subchannel}^{SL}$).

In step S903, the user equipment determines a resource index $L_{Init}$ of a physical sidelink control channel (PSCCH).

Optionally, if the user equipment determines that the number of bits in the indication field for lowest index of the subchannel allocation to the initial transmission is greater than 0, or if the indication field for lowest index of the subchannel allocation to the initial transmission is present, the user equipment determines that the resource index $L_{Init}$ of the PSCCH is equal to a value indicated by the indication field for lowest index of the subchannel allocation to the initial transmission. Otherwise, optionally, the user equipment determines that the resource index $L_{Init}$ of the PSCCH is equal to 0.

Optionally, if the user equipment determines that the number of bits in the indication field for lowest index of the subchannel allocation to the initial transmission is equal to 0, or if the indication field for lowest index of the subchannel allocation to the initial transmission is not present or is missing or absent, the user equipment determines that the resource index $L_{Init}$ of the PSCCH is equal to 0. Otherwise, optionally, the user equipment determines that the resource index $L_{Init}$ of the PSCCH is equal to the value indicated by the indication field for lowest index of the subchannel allocation to the initial transmission.

Embodiment 10

Figure 13:
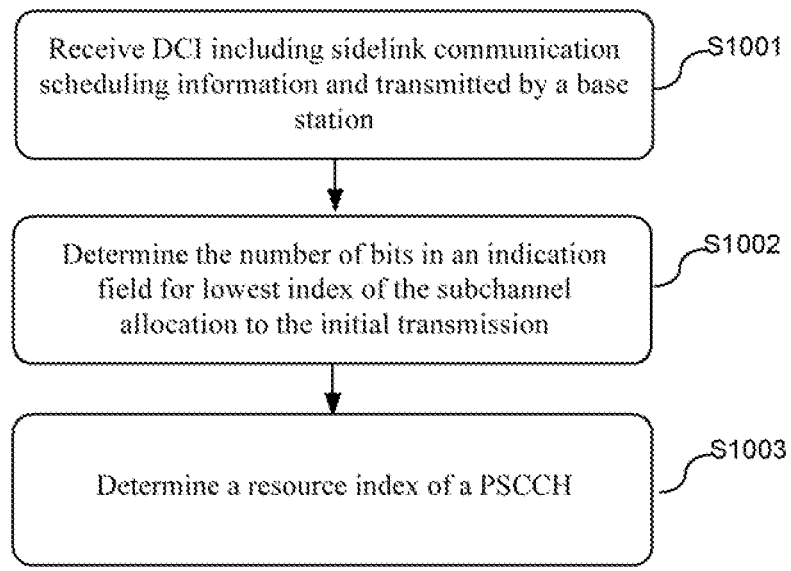
FIG. 13 is a schematic diagram showing a basic procedure of a method performed by user equipment according to Embodiment 10 of the present invention.

FIG. 13 is a schematic diagram showing a basic procedure of a method performed by user equipment according to Embodiment 10 of the present invention.

The method performed by user equipment according to Embodiment 10 of the present invention is described in detail below in conjunction with the basic procedure diagram shown in FIG. 13.

As shown in FIG. 13, in Embodiment 10 of the present invention, steps performed by the user equipment include the following steps.

In step S1001, the user equipment receives DCI including sidelink communication scheduling information and transmitted by a base station.

Optionally, the user equipment is LTE sidelink communication user equipment.

Optionally, the base station is a gNB.

Optionally, the DCI including the sidelink communication scheduling information includes an SPS activation/release indication field.

In step S1002, the user equipment determines the number of bits in an indication field for lowest index of the subchannel allocation to the initial transmission.

Optionally, the user equipment determines that the number of bits in the indication field for lowest index of the subchannel allocation to the initial transmission is equal to floor($\log_2 N_{subchannel}^{SL}$).

In step S1003, the user equipment determines a resource index $L_{Init}$ of a physical sidelink control channel (PSCCH).

Optionally, if the number of subchannels $N_{subchannel}^{SL}$ is configured to be greater than 1, or the number of subchannels $N_{subchannel}^{SL}$ is configured to be unequal to 1, the user equipment determines that the resource index $L_{Init}$ of the PSCCH is equal to a value indicated by the indication field for lowest index of the subchannel allocation to the initial transmission. Otherwise, optionally, the user equipment determines that the resource index $L_{Init}$ of the PSCCH is equal to 0.

Optionally, if the number of subchannels $N_{subchannel}^{SL}$ is configured to be equal to 1, the user equipment determines that the resource index $L_{Init}$ of the PSCCH is equal to 0. Otherwise, optionally, the user equipment determines that the resource index $L_{Init}$ of the PSCCH is equal to the value indicated by the indication field for lowest index of the subchannel allocation to the initial transmission.

Example 11

Figure 14:
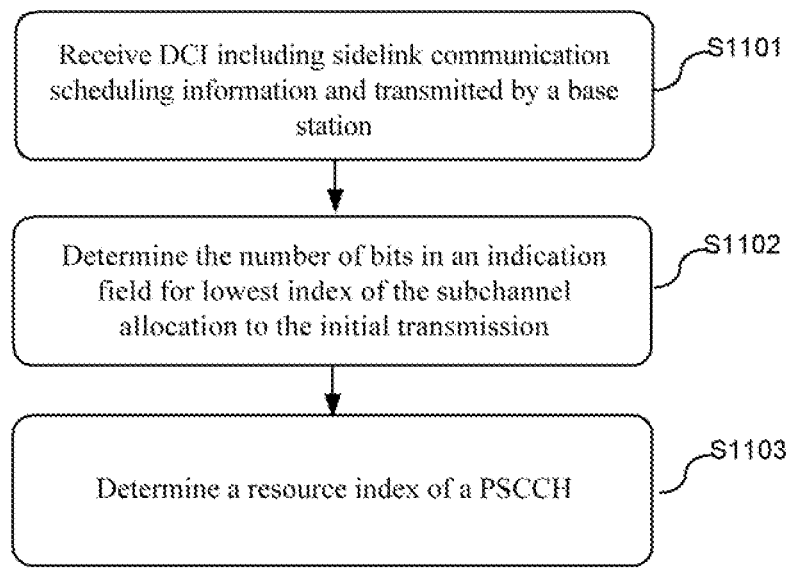
FIG. 14 is a schematic diagram showing a basic procedure of a method performed by user equipment according to Embodiment 11 of the present invention.

FIG. 14 is a schematic diagram showing a basic procedure of a method performed by user equipment according to Embodiment 11 of the present invention.

The method performed by user equipment according to Embodiment 11 of the present invention is described in detail below in conjunction with the basic procedure diagram shown in FIG. 14.

As shown in FIG. 14, in Embodiment 11 of the present invention, steps performed by the user equipment include the following steps.

In step S1101, the user equipment receives DCI including sidelink communication scheduling information and transmitted by a base station.

Optionally, the user equipment is LTE sidelink communication user equipment.

Optionally, the base station is a gNB.

Optionally, the DCI including the sidelink communication scheduling information includes an SPS activation/release indication field.

In step S1102, the user equipment determines the number of bits in an indication field for lowest index of the subchannel allocation to the initial transmission.

Optionally, if $N_{subchannel}^{SL}>1$ or $N_{subchannel}^{SL}$ is unequal to 1, the user equipment determines that the number of bits in the indication field for lowest index of the subchannel allocation to the initial transmission is equal to floor($\log_2 N_{subchannel}^{SL}$). Otherwise, optionally, the user equipment determines that the number of bits in the indication field for lowest index of the subchannel allocation to the initial transmission is equal to 1. Optionally, the 1-bit indication field is set to 0.

Alternatively, optionally, if $N_{subchannel}^{SL}=1$, the user equipment determines that the number of bits in the indication field for lowest index of the subchannel allocation to the initial transmission is equal to 1. Optionally, the 1-bit indication field is set to 0. Otherwise, optionally, the user equipment determines that the number of bits in the indication field for lowest index of the subchannel allocation to the initial transmission is equal to floor ($\log_2 N_{subchannel}^{SL}$).

In step S1103, the user equipment determines a resource index $L_{Init}$ of a physical sidelink control channel (PSCCH).

Optionally, the user equipment determines that the resource index $L_{Init}$ of the PSCCH is equal to the value of the indication field for lowest index of the subchannel allocation to the initial transmission.

Optionally, if the user equipment determines that the value of the indication field for lowest index of the subchannel allocation to the initial transmission is equal to 0, the user equipment determines that the resource index $L_{Init}$ of the PSCCH is equal to 0.

Embodiment 12

Figure 15:
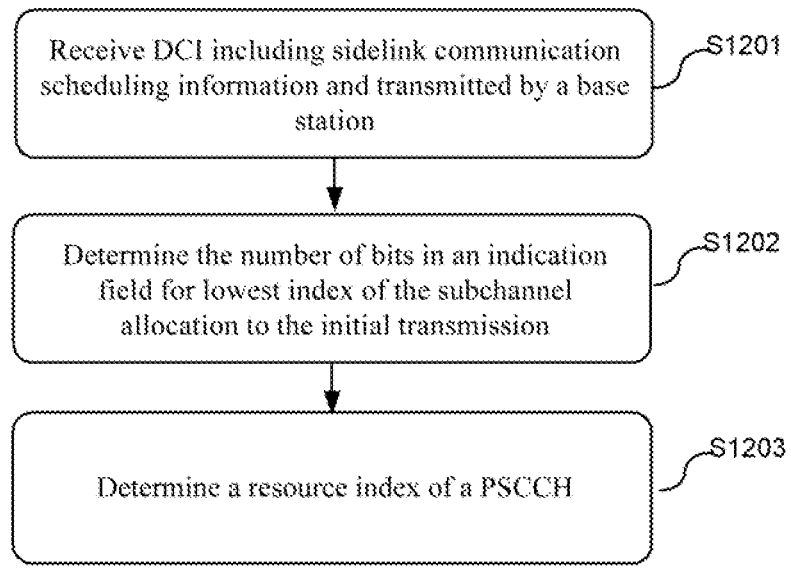
FIG. 15 is a schematic diagram showing a basic procedure of a method performed by user equipment according to Embodiment 12 of the present invention.

FIG. 15 is a schematic diagram showing a basic procedure of a method performed by user equipment according to Embodiment 12 of the present invention.

The method performed by user equipment according to Embodiment 12 of the present invention is described in detail below in conjunction with the basic procedure diagram shown in FIG. 15.

As shown in FIG. 15, in Embodiment 12 of the present invention, steps performed by the user equipment include the following steps.

In step S1201, the user equipment receives DCI including sidelink communication scheduling information and transmitted by a base station.

Optionally, the user equipment is LTE sidelink communication user equipment.

Optionally, the base station is a gNB.

Optionally, the DCI including the sidelink communication scheduling information includes an SPS activation/release indication field.

In step S1202, the user equipment determines the number of bits in an indication field for lowest index of the subchannel allocation to the initial transmission.

Optionally, the user equipment determines that the number of bits in the indication field for lowest index of the subchannel allocation to the initial transmission is equal to floor($\log_2 N_{subchannel}^{SL}$).

In step S1203, the user equipment determines a resource index $L_{Init}$ of a physical sidelink control channel (PSCCH). Optionally, the user equipment determines that the resource index $L_{Init}$ of the PSCCH as the lowest index of the subchannel allocated for the initial transmission in sidelink communication scheduling (or configuration) grant information.

Optionally, if the number of subchannels is configured to be 1, or if the user equipment determines that the number of bits in the indicator for lowest index of the subchannel allocation to the initial transmission is 0, the user equipment determines the resource index $L_{Init}$ of the PSCCH is 0.

Figure 16:
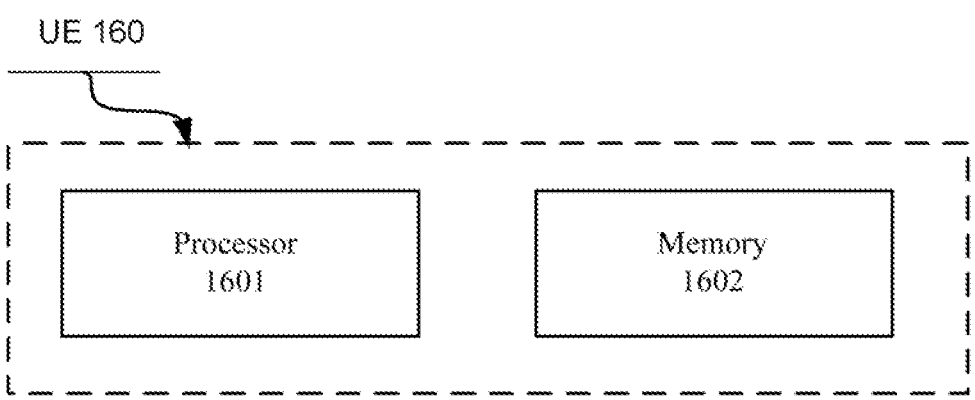
FIG. 16 is a block diagram showing user equipment according to an embodiment of the present invention.

FIG. 16 is a block diagram showing user equipment (UE) involved in the present invention. As shown in FIG. 16, the user equipment (UE) 160 includes a processor 1601 and a memory 1602. The processor 1601 may include, for example, a microprocessor, a microcontroller, an embedded processor, and the like. The memory 1602 may include, for example, a volatile memory (such as a random access memory (RAM)), a hard disk drive (HDD), a non-volatile memory (such as a flash memory), or other memories. The memory 1602 stores program instructions. The instructions, when run by the processor 1601, can perform the foregoing method performed by user equipment as described in detail in the present invention.

The methods and related devices according to the present invention have been described above in conjunction with the preferred embodiments. It should be understood by those skilled in the art that the methods shown above are only exemplary, and the above-described embodiments can be combined with one another as long as no contradiction arises. The method of the present invention is not limited to steps or sequences illustrated above. The network node and the user equipment illustrated above may include more modules; for example, they may further include modules which can be developed or developed in the future to be applied to modules of a base station, an MME, or UE. Various identifiers shown above are only exemplary and are not intended to be limiting. The present invention is not limited to specific information elements serving as examples of these identifiers. Those skilled in the art can make various alterations and modifications according to the teachings of the illustrated embodiments.

It should be understood that the embodiments above of the present invention can be implemented by software, hardware or a combination of the software and the hardware. For example, various components of the base station and user equipment in the above embodiments can be implemented by multiple devices, and these devices include, but are not limited to: an analog circuit device, a digital circuit device, a digital signal processing (DSP) circuit, a programmable processor, an application specific integrated circuit (ASIC), a field programmable gate array (FPGA), and a complex programmable logic device (CPLD), and the like.

In this application, the "base station" may refer to a mobile communication data and control exchange center with large transmission power and a wide coverage area, including functions such as resource allocation and scheduling, data reception and transmission. "User equipment" may refer to a user mobile terminal, for example, including terminal devices that can communicate with a base station or a micro base station wirelessly, such as a mobile phone, a laptop computer, and the like.

Moreover, the embodiments of the present invention disclosed herein can be implemented on a computer program product. More particularly, the computer program product is a product as follows: a product having a computer readable medium encoded with computer program logic thereon, when being executed on a computing equipment, the computer program logic provides related operations to implement the technical solution of the prevent invention. When being executed on at least one processor of a computing system, the computer program logic enables the processor to execute the operations (methods) described in the embodiments of the present invention. Such setting of the present invention is typically provided as software, codes and/or other data structures provided or encoded on the computer readable medium, e.g., an optical medium (e.g., compact disc read-only memory (CD-ROM)), a flexible disk or a hard disk and the like, or other media such as firmware or micro codes on one or more read-only memory (ROM) or random access memory (RAM) or programmable read-only memory (PROM) chips, or a downloadable software image, a shared database and the like in one or more modules. The software or the firmware or such configuration can be installed on the computing equipment, so that one or more processors in the computing equipment execute the technical solution described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general-purpose processor may be a microprocessor; or the processor may be an existing processor, a controller, a microcontroller, or a state machine. The above-mentioned general purpose processor or each circuit may be configured with a digital circuit or may be configured with a logic circuit. In addition, when an advanced technology that can replace current integrated circuits emerges due to advances in semiconductor technology, the present invention may also use integrated circuits obtained using this advanced technology.

Although the present invention is already illustrated above in conjunction with the preferred embodiments of the present invention, those skilled in the art should understand that, without departing from the spirit and scope of the present invention, various modifications, replacements and changes can be made to the present invention. Therefore, the present invention should not be defined by the above embodiments, but should be defined by the appended claims and equivalents thereof.

The invention claimed is:

1. A user equipment, comprising:
reception circuitry configured to receive a downlink control information (DCI) format 5A from a base station; and
determination circuitry configured to determine whether a field "Lowest index of the sub-channel allocation to the initial transmission" is present in the DCI format 5A, wherein
the determination circuitry is further configured to determine a resource index $L_{Init}$ of a physical sidelink control channel (PSCCH) such that:
if the field "Lowest index of the sub-channel allocation to the initial transmission" is present in the DCI format 5A, the resource index $L_{Init}$ is a value indicated by the "Lowest index of the sub-channel allocation to the initial transmission" field, and otherwise, the resource index $L_{Init}$ is 0.

* * * * *